United States Patent
Lehrieder et al.

(10) Patent No.: US 6,877,943 B2
(45) Date of Patent: Apr. 12, 2005

(54) DEVICE FOR CONVEYING A SUPPLY ROLL

(75) Inventors: Erwin Paul Josef Lehrieder, Gaukönigshofen (DE); Andreas Bruno Rösch, Karlstadt (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 172 days.

(21) Appl. No.: 10/257,970

(22) PCT Filed: Jan. 24, 2001

(86) PCT No.: PCT/DE01/00264

§ 371 (c)(1), (2), (4) Date: Oct. 28, 2002

(87) PCT Pub. No.: WO01/83334

PCT Pub. Date: Nov. 8, 2001

(65) Prior Publication Data

US 2003/0133781 A1 Jul. 17, 2003

(30) Foreign Application Priority Data

Apr. 28, 2000 (DE) .................... 100 20 909

(51) Int. Cl.$^7$ ............................. B65G 57/22
(52) U.S. Cl. .................. 414/278; 414/222.11; 198/412
(58) Field of Search .................. 414/911, 426, 414/222.01, 222.11, 267, 278, 279; 198/411, 412, 413, 725, 726, 762

(56) References Cited

U.S. PATENT DOCUMENTS

| | | | | |
|---|---|---|---|---|
| 2,732,867 A | * | 1/1956 | May et al. .................. 144/128 |
| 3,690,472 A | * | 9/1972 | Poore et al. .................. 198/535 |
| 4,096,936 A | * | 6/1978 | Nielsen .................. 198/370.06 |
| 4,120,406 A | * | 10/1978 | Durnig .................. 414/791.5 |
| 4,318,468 A | * | 3/1982 | Bodewes et al. .................. 198/718 |
| 4,386,741 A | | 6/1983 | Weiss et al. |
| 5,813,513 A | * | 9/1998 | Taube .................. 198/803.14 |
| 6,138,938 A | * | 10/2000 | Lehrieder et al. .................. 242/559.3 |
| 6,352,148 B1 | | 3/2002 | Hindemith |

FOREIGN PATENT DOCUMENTS

| | | |
|---|---|---|
| DE | 2 145 179 | 3/1972 |
| DE | 29 44 265 A1 | 3/1982 |
| DE | 32 21 343 A1 | 12/1983 |
| DE | 39 10 444 C2 | 10/1993 |
| DE | 198 53 026 C1 | 3/2000 |
| EP | 0 096 323 A2 | 12/1983 |
| GB | 2 244 984 A | 12/1991 |
| WO | WO 98/12133 | 3/1998 |

\* cited by examiner

*Primary Examiner*—Eileen D. Lillis
*Assistant Examiner*—Charles A Fox
(74) *Attorney, Agent, or Firm*—Jones Tullar & Cooper PC

(57) ABSTRACT

At least one supply roll is conveyed by use of a roll support surface. The supply roll can be placed on the roll support surface with its longitudinal axis essentially horizontal. The supply roll can be rolled in at least one conveying direction with its lateral surface on the roll support surface. At least one transport element, with at least one rotating drive device can be brought into contact with the lateral surface of the supply roll from below. The drive device can be driven in at least one conveying direction.

29 Claims, 4 Drawing Sheets

DEVICE FOR CONVEYING A SUPPLY ROLL

FIELD OF THE INVENTION

The present invention is directed to a device for conveying a supply roll. The supply roll is typically a large roll of paper intended for use in a printing press.

BACKGROUND OF THE INVENTION

Apron conveyors are known from WO 98/12133 A1, on which paper rolls can be placed horizontally, i.e. with their longitudinal axes extending nearly horizontally, and which paper rolls can then be conveyed in a direction of the front or end faces of the paper rolls. Conveying carts are known from WO 98/12133 A1 which carts, when loaded with paper rolls, can be moved through a printing plant on tracks.

Driverless conveying vehicles are known from DE 39 10 444 C2 which vehicles, when loaded with paper rolls, can be moved from a paper roll storage facility to rotary printing presses. An inclined roll feeding surface is provided, in accordance with the teachings of DE 39 10 444 C2, for conveying the paper rolls in the roll storage facility. The roll storage facility has a roll feeding surface extending obliquely from the top to the bottom in the conveying direction, and at whose upper end the paper rolls are unloaded. Because of the weight of the paper rolls and the inclined roll feeding surface, a descending force along the slope is generated, which force acts in the conveying direction. The paper rolls roll downward on the roll feeding surface without any additional conveying devices and can be conveyed in the conveying direction in this way. Further in accordance with the teachings of DE 39 10 444 C2, bumper elements are arranged in the roll feeding surface for controlling the conveying movement, by use of which, the downward rolling paper rolls can be slowed down.

GB 2 244 984 A discloses supply rolls which roll off on a surface and which are conveyed from above by the use of a circulating drive mechanism.

DE 21 45 179 A1 shows supply rolls which are loaded onto conveying carts by pushing blocks.

DE 29 44 265 A1 describes a circulating conveyor belt with receivers for supply rolls.

SUMMARY OF THE INVENTION

The object of the present invention is directed to providing a device for conveying a supply roll.

In accordance with the present invention, this object is attained by providing a roll feeding surface on which a supply roll can be deposited with its longitudinal axis generally horizontal. The supply roll is moved along the roll feeding surface in at least one conveying direction by the action of conveying devices. Each of the conveying devices has at least one circulating driving mechanism that includes an upper belt. The upper belt engages the surface of the supply roll. A second driving mechanism is arranged after, in the conveying direction, the first driving mechanism and laterally offset. An overlap is provided between the laterally arranged conveying mechanisms.

The advantages which can be achieved by the present invention reside, in particular, in that it is possible, by the movement of the driving mechanism, to convey the supply rolls in the conveying direction on the roll feeding surface independently of the weight forces acting on the supply rolls. For this purpose, the upper belt of the driving mechanism, which can be driven in a circulating manner, is brought indirectly or directly into contact with the surface area of the supply roll from below the supply roll. By the movement of the driving mechanism, a force which is directed in the conveying direction, is transferred from the driving mechanism to the supply roll. The conveying element can contain additional components besides the driving mechanism, for example a frame, drive motors, spring elements and the like.

Since the supply rolls to be conveyed typically have a substantial weight, a considerable potential for danger to the press operators is posed by storing such supply rolls on an inclined, roll feeding surface. Therefore, in accordance with a preferred embodiment of the present invention, the roll feeding surface is substantially horizontal. The roll feeding surface can also be slightly inclined for aiding the conveying movement of the driving mechanism. It follows from this that substantially no descending forces along the slope, which forces correspond to the weight of the supply rolls, act on the supply rolls, and driving of the supply rolls takes place solely by the actuation of the driving mechanism. Potential danger, because of a supply roll unintentionally rolling down the roll feeding surface, is removed by the structure of the present invention. The supply rolls remain in their respective positions even when the device as a whole fails. It is therefore possible to automate such a device for conveying supply rolls in a simple way, particularly without any additional protective devices. Supervision of the device for conveying supply rolls, by the press operators, is not absolutely required because of the reduced endangerment to the attendant personnel which is posed by the device for conveying supply rolls in accordance with the present invention.

No height difference is required for conveying the supply rolls, so that it is particularly advantageous if the roll feeding surface is substantially level with the ground. Lifting of the heavy supply rolls, for placing them on the roll feeding surface, can be largely omitted because of this arrangement of the roll feeding surface.

To accomplish the subsequent conveyance of the supply rolls from the device to other work stations, it is possible to provide further conveying devices at one side of the supply roll conveying device. Such further conveying devices can be, for example, a rolling cart with a receiving element in a trough shape, on which the supply roll can be deposited. If the height of the roll feeding surface substantially corresponds to the height of the upper edge of the subsequent supply roll conveying device, at least on the side where the conveying devices are arranged, the supply rolls can be rolled, without substantial lifting or holding, from the roll feedings surface onto the subsequent conveying device and, if required, back from the subsequent conveying device onto the roll feeding surface.

If a plurality of drive mechanisms are provided on the device for conveying a supply roll in accordance with the present invention, it is advantageous if these can be actuated individually and/or in groups separately from each other. If several rolls are stored on the roll feeding surface, it is possible to convey these individually and independently of each other in the conveying direction on the roll feeding surface.

A reversal of the conveying direction of the supply rolls is possible by reversing the driving mechanisms, so that it is also possible to remove supply rolls from the roll feeding surface.

If the driving mechanism is arranged essentially at right angles with respect to the longitudinal axis of the supply roll, only a driving force which acts substantially on a point, or along a line, on the surface area of the supply roll, will be transmitted by a driving mechanism to a supply roll. So that in those cases in which the driving force possibly acts off center, and so that the supply rolls may be turned around their vertical axes extending through the center of gravity of the supply roll, at least two driving mechanisms, which are extending parallel to each other in the conveying direction, can be provided on the device for conveying supply rolls. If the supply roll is then deposited on the roll feeding surface, in such a way that the center of gravity of the supply roll lies between the two driving mechanisms that are extending parallel to each other, twisting of the supply roll can be prevented by a synchronous operation of the two driving mechanisms. A roll-off movement of the supply roll, which roll-of movement is substantially linearly directed can be accomplished.

A lateral distance between each two driving mechanisms which are extending parallel to each other, should be less than or equal to half the length of the longitudinal axes of the supply rolls to be conveyed. If more than three driving mechanisms are provided on the device, this maximum lateral distance between the driving mechanisms assures that the supply rolls to be conveyed are each in contact with at least two driving mechanisms. It has been shown to be particularly advantageous if the lateral distance between the driving mechanisms corresponds substantially to one third of the axial length of the supply rolls to be conveyed. As a result, one driving mechanism is available for each quarter of the supply roll, which spacing makes the dependable conveyance of the supply rolls always possible.

It is basically possible to provide the devices for conveying a supply roll at any length. Thus, the supply rolls can be conveyed along a distance on the roll feeding surface which is of any arbitrary length. However, it is more cost-effective to provide conveying elements with drive mechanisms having one or several defined lengths, for example the standard lengths of a modular system. In the construction of devices whose roll feeding surfaces do no correspond to the length of the available driving mechanisms, several of these driving mechanisms can be combined and can be arranged one after the other in the conveying direction. If the individual driving mechanisms, which are arranged one behind the other, have no, or only a slight lateral offset, i.e. if they extend substantially in a line, they together will constitute a driving train which can extend over the entire length of the roll feeding surface. However, the driving mechanisms, which are arranged one behind the other, can also have a more substantial lateral offset, as long as in each area of the roll feeding surface, a sufficient number of driving mechanisms will always simultaneously come into contact with the supply rolls so that the supply rolls will be adequately supported and conveyed.

If the adjacent driving mechanisms are arranged directly behind or after, in the roll conveying direction, each other, so that a joint, or a defined spacing distance, results between each of the driving mechanisms arranged behind or after each other, it is possible that an insufficient driving force will be transferred to the supply rolls in the area between the driving mechanisms, since, in this area, none of the driving mechanisms, which are arranged behind each other comes into contact with the supply roll in the manner required for supply roll conveyance. It is therefore particularly advantageous if the driving mechanisms, which are arranged behind or after each other in the roll conveying direction have at least a slight overlap in the roll conveying direction. To this end, it is desirable for the driving mechanisms arranged in the conveying direction to be arranged laterally offset, wherein the width of the lateral offset must at least correspond to the width of the driving mechanisms. Moreover, each of the driving mechanisms can extend, in its length, in such a way that an initial or starting end of an upper belt of a subsequent or following driving mechanism starts before the end of an upper belt of a prior or previous driving mechanism. As a result, each of the two driving mechanisms arranged one behind the other in the supply roll conveying direction come into contact, in a laterally offset manner, with the surface area of the supply roll in the overlapping area of the driving mechanisms which are arranged behind each other.

The force required for conveying the supply roll can be transmitted directly or indirectly to the supply roll. If the force is directly transmitted by shaped elements in contact with the surface area of the supply roll, the surface of the supply roll will be treated particularly gently because the shaped elements will be designed as axially symmetrical components, i.e. in the manner of rollers or cylinders. If, in this case, the rollers or cylinders are seated so that they are freely rotatable, the driving roller or driving cylinder can roll off substantially without resistance on the supply roll in the course of its movement, so that the surface of the supply roll is not scratched or torn open.

For the driving force of the driving mechanism to be transferred to the supply roll, particularly in the case of a frictional force transfer, it may be necessary for the driving mechanism to be pushed, with a certain amount of pressure, against the underside of the supply roll. To insure that this driving pressure is as even as possible, and that no pressure deformations are created on the supply roll, the portions of the driving mechanism which come into contact with the supply roll can be resiliently seated or supported. The driving mechanism can elastically yield or move downwardly when a supply roll is deposited on the roll feeding surface until the supply roll comes into contact with the roll feeding surface.

The portions of the drive mechanism which come into contact with the supply roll, for example a drive belt, can be supported on a carrier element, which carrier element is resiliently seated in the direction of the weight of the supply roll in respect to the portion of the device constituting the roll feeding surface, for example a frame or stand. As a result, the carrier element is pressed downward by the weight of a deposited supply roll against, for example a spring force, so that the driving mechanism is pressed between the supply roll and the carrier element. If the driving force is transmitted by frictional contact, it is possible to assure that the driving mechanism is pressed against the supply roll with a defined minimum pressure.

To make printing establishments even more efficient, it is possible to provide the device for conveying a supply roll in accordance with the present invention with a control mechanism, by use of which automatic operation is made possible. The installation can, of course, also be manually controlled by the operators, wherein tipping operations are particularly recommended for avoiding accidents.

If the driving mechanism can be driven in two directions, forward and in reverse, a back-up operation is made possible. In the course of this back-up operation, the supply rolls can be removed from the device by operating the driving mechanism in the forward direction and, by operating the driving mechanism in the reverse direction the supply rolls can be placed into the device. It is thus possible, for example, to deposit partially used supply rolls from the roll stand back in the roll conveying device, wherein the same conveying mechanisms can be used for conveying the rolls away from the device, as well as to it. Since, with a horizontally extending roll feeding surface, no descending forces along the slope act in a defined direction, it is possible to realize a back-up operation particularly well. For conveying in both directions of conveyance, it is necessary for the driving mechanism to provide substantially the same driving force in both directions.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENT

Figure 1:
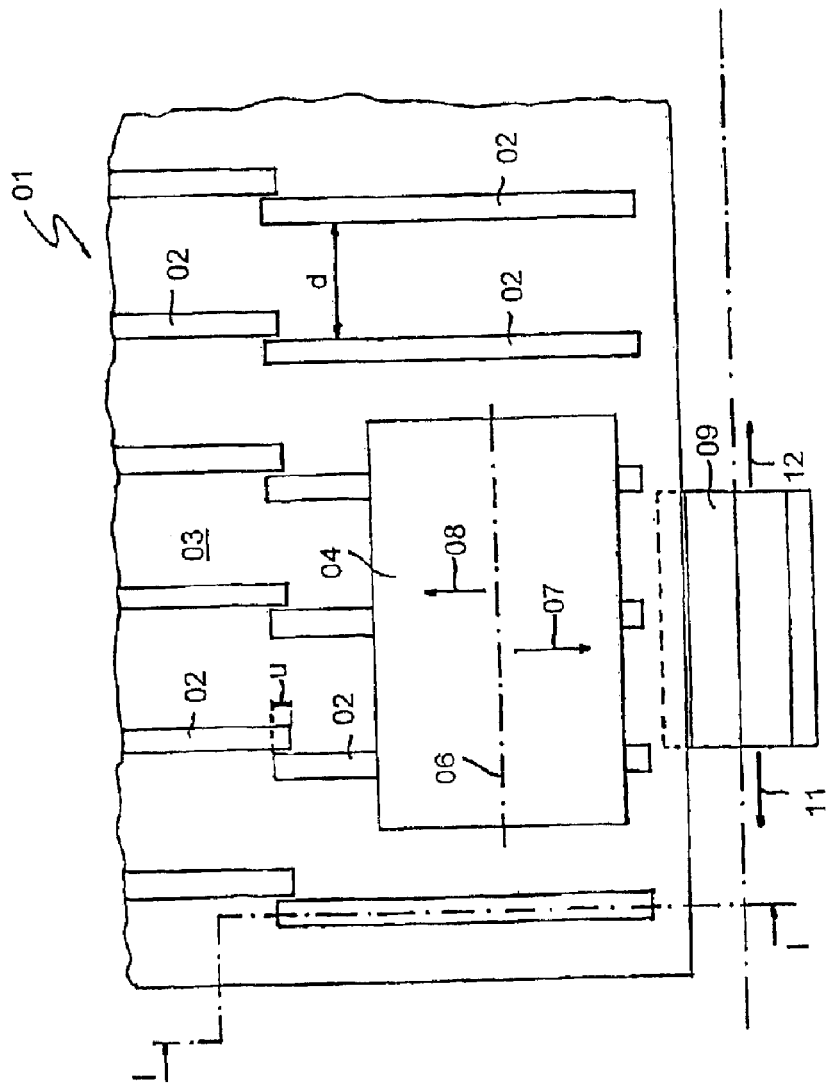
FIG. 1, a schematically represented first preferred embodiment of a device for conveying a supply roll in accordance with the present invention in a view taken from above the device, FIG. 2, a cross-sectional view of the device of FIG. 1 taken along the section line I—I of FIG. 1, FIG. 3, a second preferred embodiment of a device in accordance with the present invention in a perspective view taken from above and in, FIG. 4, a driving mechanism for the device in FIG. 3.

Referring initially to FIG. 1, it is possible to see a portion of a device 01 for conveying a supply roll with driving mechanisms 02, which are only schematically depicted in FIG. 1 and which are a part of conveying elements 17, which cannot be seen in FIG. 1, but which are shown in FIG. 1. Several supply rolls 04 can be deposited on a level, horizontally extending roll feeding surface 03 of the device 01, on which roll feeding surface 03 they are supported and are oriented with their longitudinal axes 06 extending horizontally. Portions of the surface area of the supply roll 04, which is, for example a paper roll 04, rest on the roll feeding surface 03, so that the paper roll 04 can be conveyed in first and second, or forward and backward conveying directions by moving the driving mechanism 02 selectively in the forward or reverse direction. In FIG. 1 the forward and backward conveying directions are indicated by directional arrows 07 or 08. A roll conveying element 09, for example a rolling cart, is arranged at one side of the device 01. The roll conveying element 09 can be driven on rails, which are not specifically represented in FIG. 1 but which are shown in FIG. 2, transversely in respect to the conveying direction 08 or 08 of the device 01, which cart direction is indicated by the directional arrows 11 and 12.

Figure 2:
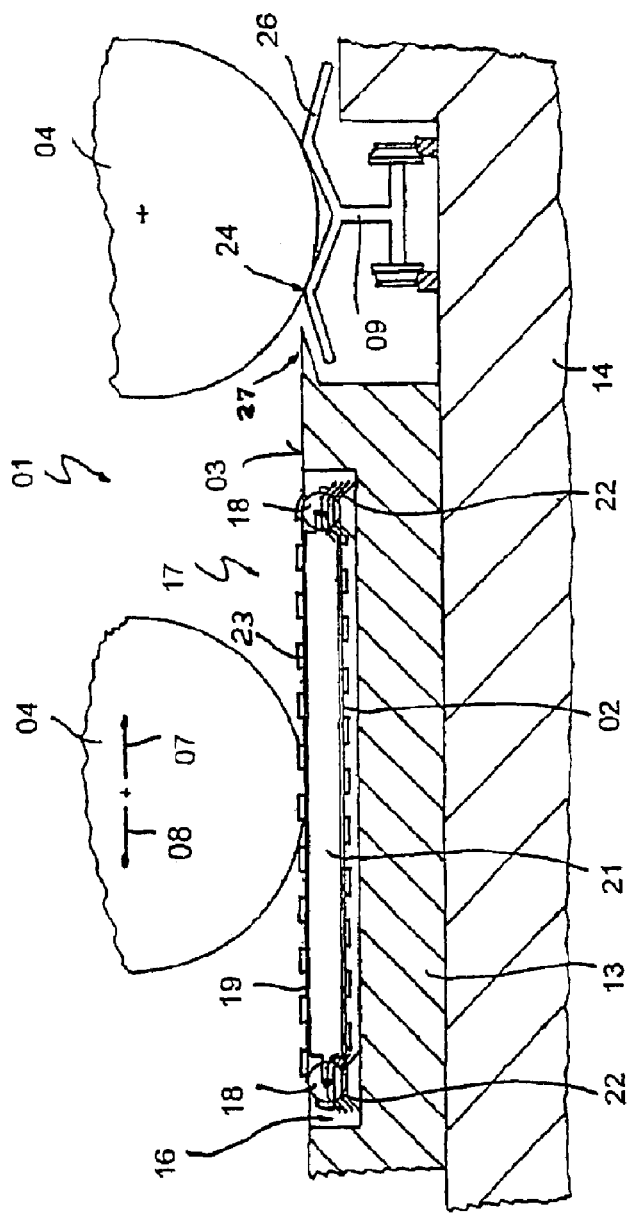

The device for conveying a supply roll 01 is depicted in FIG. 2 with a conveying element 17 and with the associated driving mechanism 02 in cross section, taken along the section line I—I of FIG. 1. For greater clarity, the components of the conveying element 17 are not represented in cross section. Furthermore, a roll conveying element or cart 09 is represented which cart 09, in the operational state represented in FIG. 2, has already been loaded with a paper roll 04. A pedestal or base 13 of the device 01 can be seen in FIG. 2, and which is arranged on a foundation 14 and whose top constitutes the top of the roll feeding surface 03. Depressions or channels 16 are provided in the roll feeding surface 03, in each of which depression 16 a conveying element 17 with a driving mechanism 02, two reversing cylinders 18, a carrier element 21 and a plurality of spring elements 22, are arranged.

In the device 01, the driving mechanism 02 is embodied as a toothed belt with knobs or cleats 23, and the toothed belt can be driven by the reversing cylinders 18 to move or to travel in first and second or forward and backward directions. The roll feeding surface 03 extends essentially horizontally, so that no movement causing forces will act on the paper rolls 04 when the driving mechanism 02 is stopped. If the driving mechanisms 02 are driven by the reversing cylinders 18, frictional forces act on the contact surface between the paper roll 04 and the driving mechanism 02, which frictional forces are directed in the first or in the second conveying directions 07 or 08, depending on the driving direction of the driving mechanism 02.

So that an upper belt portion 19 of the toothed belt of the driving mechanism 02 is pressed with sufficient force against the paper roll 04, upper belt 19 is supported on a carrier element 21 which is arranged between the reversing cylinders 18, and which extends at least slightly above the level of the roll feeding surface 03. In turn, the carrier element 21 is supported on the pedestal or the base 13 by four spring elements 22, which are, for example, designed as plate spring packages, of which only two are represented in FIG. 2. In the no-load state, the knobs or cleats 23 that are arranged on the top of the upper belt 19, project slightly upward past the roll feeding surface 03. If a paper roll 04 comes into contact with the driving mechanism 02 from above, the knobs or cleats 23, and with them the driving mechanism 02 and the supporting carrier element 21, are pushed sufficiently far down in the area of contact with the paper roll 04 until the level of the roll feeding device 03 has been reached by the surface of the paper roll 04. In the course of this depression of the driving mechanism 02, the spring elements 22 are deformed and in this way provide a spring force which is directed opposite to the weight of the paper roll 04 in the contact area between the driving mechanism 02 and the paper roll 04. The weight of the paper roll 04 is substantially supported on the base 13 in the roll feeding device 03.

The roll conveying elements or carts 09 are provided, movable on tracks, at a side of the device, as seen in FIGS. 1 and 2. For example, the roll conveying element or cart 09 can be used for conveying paper rolls 04 from the device 01 to a roll changer, which is not specifically represented, of a web-fed rotary printing press, and during back-up or reverse operations, for returning only partially used-up paper rolls 04, for example. So that the paper rolls 04 can be rolled from the roll feeding surface 03 onto the roll conveying element or cart 09 and, if required, rolled back substantially without being lifted, an upper edge 24 of the roll conveying element or cart 09, which is constituted by the upper edge 24 of a trough-shaped receiving element 26 in this case, is arranged on the level of the roll feeding surface 03. This can be achieved, for example, by an appropriate selection of the height of the base 13, or by the selection of the height of the roll conveying element or cart 09.

So that, in the course of rolling a paper roll 04 from the roll feeding surface 03 onto the receiving element 26 of the cart 09, the pitching moments acting on the roll conveying element or cart 09 are limited, an upper edge 27 of the base 13 of the device 01 projects on the side of the roll conveying element or cart 09 so far that the receiving element 26 of the cart 09 can be arranged partially underneath the upper edge 27 of the base 13, as shown in FIG. 2.

Referring again to FIG. 1, it can be seen that several essential identical driving mechanisms 02 are provided in base 13 and are extending next to each other and are parallel with each other in the conveying direction. The several driving mechanisms 02 are also positioned at a slight lateral offset distance one behind the other in the device 01. A lateral spacing distance "d" is provided between adjacent ones of the driving mechanisms 02 which are arranged parallel with each other in the conveying direction. This lateral spacing distance "d" corresponds to approximately one-third of the axial length of the paper rolls 04 to be conveyed, so that it is assured that each paper roll 04 comes to rest on respectively three driving mechanisms 02. The driving mechanisms 02 arranged behind or after each other in the conveying directions 07 or 08 are arranged in width laterally offset and interdigitating, so that the ends of a first group of the driving mechanisms 02 can extend past the laterally offset and adjacent ends of a respectively following or second group of driving mechanisms 02. As a result, there is an overlap of a distance "u" between the driving mechanisms 02 arranged behind or after each other, so that no areas are created between the driving mechanisms 02 arranged behind or after each other, in which areas the paper rolls 04 could not be dependably driven.

Figure 3:
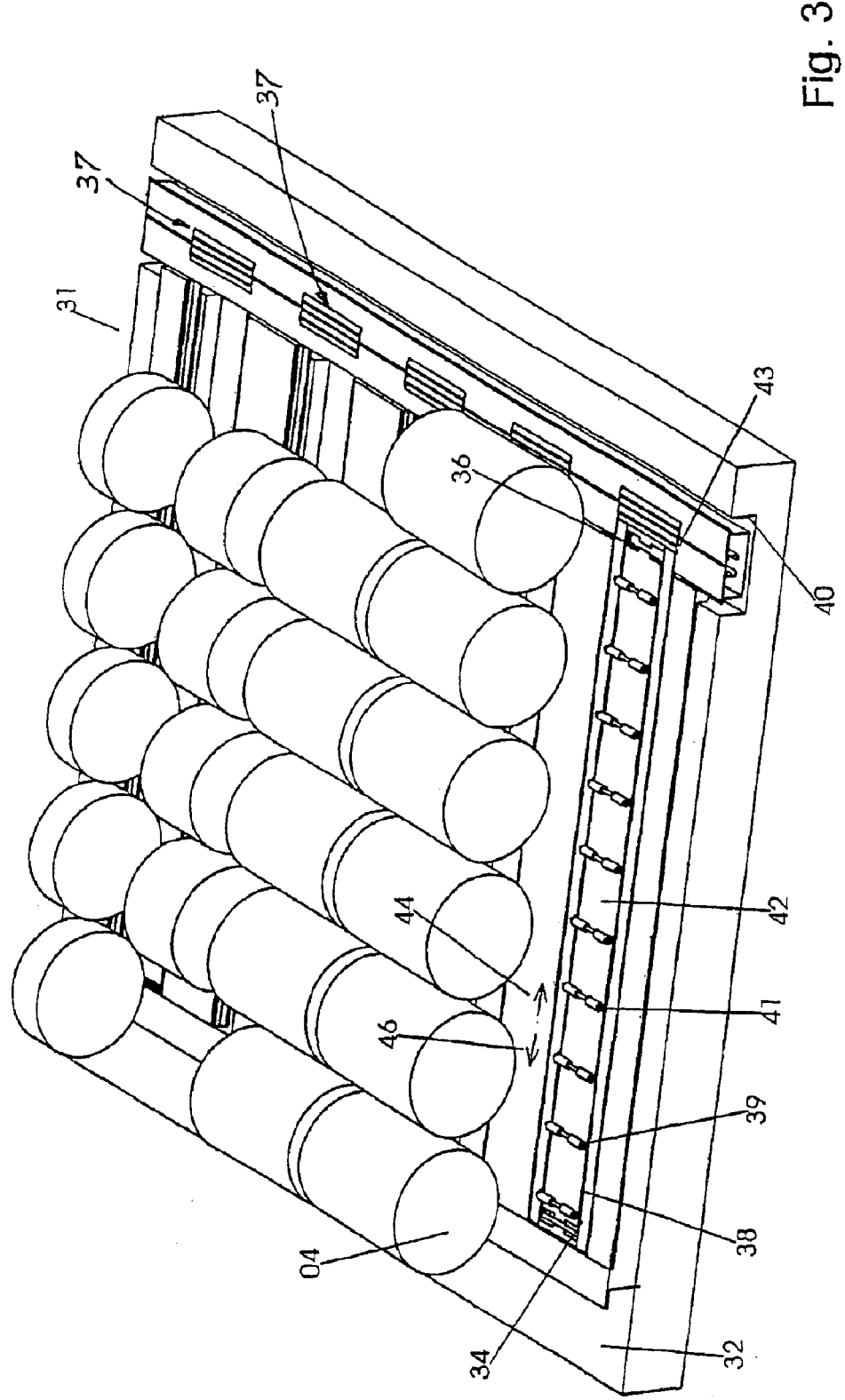

Turning now to FIG. 3, there is shown a device for conveying a supply roll 31 with a roll feeding surface 32 which is extending horizontally level with the ground, and on which surface 32 a multitude of supply rolls 04, for example paper rolls 04, can be deposited next to and behind each other. A conveying element 36 is arranged in each of a plurality of depressions or channels 34 of the roll feeding surface 32. The paper rolls 04 can be conveyed to roll conveying elements or carts 37, which can be moved along tracks, that are not specifically represented. The roll conveying elements or carts 37 are arranged in a depression 40 in order to make possible a substantially identical level between an upper edge 43 of the roll feeding surface 32 and the receiving element 26 of the roll conveying element or cart 37 when the roll feeding surface 32 is arranged level with the ground. Depending on the movement directions of the conveying mechanisms 36, the paper rolls 04 can be conveyed in first or second conveying directions represented by the directional arrows 44 or 46, as seen in FIG. 3.

Figure 4:
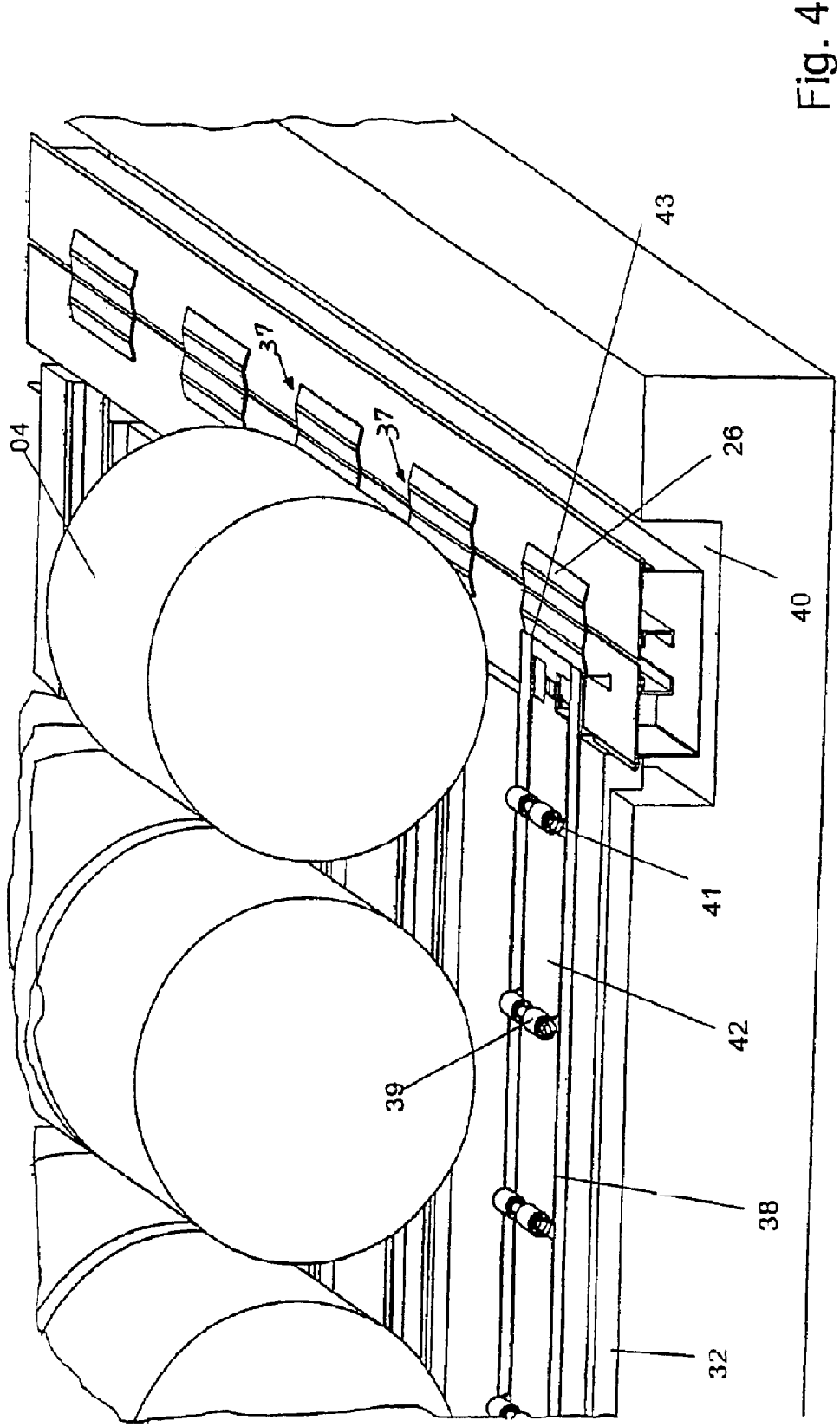

One end of a conveying element 36 can be seen in an enlarged representation in FIG. 4. The conveying element 36 has two driving mechanisms 38, which are embodied in the form of drive chains 38, and on whose sides facing the paper rolls 33, shaped elements 39, which are embodied as cylinders 39, or individual rollers, are fastened. For fastening the shaped element, such as a cylinder or a roller 39 on the two driving mechanisms or chains 38, schematically represented bearing elements 41 are provided in pairs on the driving mechanisms 38, and between which the cylinders or the rollers 39 are seated, and are freely rotatable. When the driving mechanisms or chains 38 are driven, the cylinders or the rollers 39 come to rest on the surface area of the paper rolls 04 and take them along in the direction of the driving direction of the conveying mechanisms or chains 38. As a result, the driving force is thus positively transmitted to the paper rolls 04, wherein damage to the surface of the paper rolls 04 is avoided because of the rotatable seating of the cylinders or the rollers 39. The depressions or channels 34 can be covered by a cover plate 42. Moreover, the edge of the cover plate 42 constitutes the upper edge 43 of the device 31 for conveying a supply roll, underneath which the driving mechanisms or chains 38 can be arranged.

The bearing elements 41 for the cylinders or rollers 39 can preferably be resiliently fastened on the driving mechanisms or chains 38, so that an axis-parallel matching to the surface area of the supply roll 04 is possible.

The axis-parallel alignment of the supply roll 04 during the conveying movement is achieved by this.

The resilient seating of the cylinder or roller 39 is used as an overload protection. When a changeable maximum load on the cylinder or roller 39, or on the driving mechanism or chain 38, is exceeded, the cylinder or roller 39 is placed on the roll feeding surface 32, and the arising forces are passed on into the latter.

While preferred embodiments of a device for conveying a supply roll in accordance with the present invention have been set forth fully and completely hereinabove, it will be apparent to one of skill in the art that a number of changes in, for example, the type of printing press being used, the specific sizes of the supply rolls, and the like could be made without departing from the true spirit and scope of the present invention which is accordingly to be limited only by the scope of the following claims.

What is claimed is:

1. A device for conveying at least one supply roll comprising:
    a roll feeding surface, said roll feeding surface adapted to support a supply roll, with a longitudinal axis of the supply roll being horizontal, and with a surface of the supply roll being rollable on said roll feeding surface in at least a first supply roll conveying direction;
    at least first and second driving mechanisms positioned in said roll feeding surface;
    at least first and second conveying elements in each of said driving mechanisms, each said conveying element including an upper surface positioned to cooperate with a surface of a supply roll from beneath the supply roll, each said upper surface having a width, a leading end and a trailing end, said at least first and second conveying elements in each said driving mechanism being parallel to each other and extending in said at least first roll conveying direction;
    means for driving each of said at least first and second conveying elements in each of said driving mechanisms in at least a first driving direction parallel to said at least first supply roll conveying direction;
    a lateral offset between said trailing end of said upper surface in said first driving mechanism and said leading end of said upper surface in said second driving mechanism; and
    an overlap between said trailing end of said upper surface in said first driving mechanism and said leading end of said upper surface in said second driving mechanism, said overlap being arranged in said at least first supply roll conveying direction.

2. The device of claim 1 wherein said roll feeding surface is generally horizontal.

3. The device of claim 1 wherein said roll feeding surface is level with the ground.

4. The device of claim 1 further including a supply roll conveying element arranged adjacent said roll feeding surface and at the same height.

5. The device of claim 4 further including an upper edge on said roll feeding surface adjacent said supply roll conveying element, and a roll receiving element on said supply roll conveying element, at least a portion of said roll receiving element being positionable beneath said upper edge of said roll feeding surface.

6. The device of claim 4 wherein said supply roll conveying element is a cart and includes a trough shaped roll receiving element.

7. The device of claim 5 wherein said supply roll conveying element is a cart and further wherein said roll receiving element is trough-shaped.

8. The device of claim 1 wherein said at least first and second driving mechanisms are selectively operable individually and in groups.

9. The device of claim 1 wherein the supply rolls have an axial length and wherein said lateral offset is less than or equal to one half of said axial length.

10. The device of claim 9 wherein said lateral offset is less than or equal to one third of said axial length.

11. The device of claim 1 wherein each said conveying element is selected from a group including drive chains and drive belts.

12. The device of claim 1 wherein said upper surface transmits a force directly to said surface of a supply roll as a frictional force.

13. The device of claim 1 wherein each said conveying element in each of said drive mechanisms is a flat belt.

14. The device of claim 1 wherein each said conveying element in each of said drive mechanisms is a knobbed belt.

15. The device of claim 1 wherein said upper surface will positively engage said surface of a supply roll in said conveying direction.

16. The device of claim 1 wherein said upper surface of each said conveying element in each of said driving mechanisms includes shaped elements arranged spaced on said upper surface, said spaced elements extending up past said roll feeding surface and being engageable with said surface of a supply roll.

17. The device of claim 16 wherein said shaped elements are cylinders having central axes, said central axes being parallel with said supply roll longitudinal axis.

18. The device of claim 16 wherein said shaped elements are rotatably supported.

19. The device of claim 17 wherein said shaped elements are rotatably supported.

20. The device of claim 1 further including resilient supports for said at least first and second driving mechanisms.

21. The device of claim 20 wherein said first and second driving mechanisms each include carrier elements, said carrier elements being supported by said resilient supports.

22. The device of claim 21 wherein each said carrier element is a resiliently supported connecting strip situated beneath, and supporting said upper surface of said at least one conveying element in each of said driving mechanisms.

23. The device of claim 21 further including first and second reversing cylinders at ends of each said carrier element, and wherein said resilient supports are plate spring packages supporting said reversing cylinders.

24. The device of claim 1 further including a plurality of supply rolls arranged on said roll feeding surface.

25. The device of claim 1 further including a control device.

26. The device of claim 1 further including means driving said conveying elements in a forward and in a reverse driving direction with respect to said supply roll conveying direction.

27. The device of claim 16 wherein said shaped elements are resiliently supported on said upper surface.

28. A device for conveying at least one supply roll comprising:
a roll feeding surface, said roll feeding surface adapted to support a supply roll, with a longitudinal axis of the supply roll being horizontal, and with a surface of the supply roll being rollable on said roll feeding surface in at least a first supply roll conveying direction;
at least first and second driving mechanisms positioned in said roll feeding surface;
at least first and second conveying elements in each of said driving mechanisms, each said conveying element including an upper surface positioned to cooperate with a surface of a supply roll from beneath the supply roll, each said upper surface having a width, a leading end and a trailing end, said at least first and second conveying elements in each said driving mechanism being parallel to each other and extending in said at least first roll conveying direction;
means for driving each of said at least first and second conveying elements in each of said driving mechanisms in at least a first driving direction parallel to said at least first supply roll conveying direction;
carrier elements for each of said first and second driving mechanism, each said carrier element including a connecting strip situated beneath, and supporting said upper surface of said at least one conveying element in each of said driving mechanisms;
first and second reversing cylinders at said leading and trailing ends of each of said first and second conveying elements, each said carrier element extending between said first and second reversing cylinders;
resilient supports between said carrier element and said reversing cylinders;
a lateral offset between said trailing end of said upper surface in said first driving mechanism and said leading end of said upper surface in said second driving mechanism; and
an overlap between said trailing end of said upper surface in said first driving mechanism and said leading end of said upper surface in said second driving mechanism, said overlap being arranged in said at least first supply roll conveying direction.

29. A device for conveying at least one supply roll comprising:
a roll feeding surface, said roll feeding surface adapted to support a supply roll, with a longitudinal axis of the supply roll being horizontal, and with a surface of the supply roll being rollable on said roll feeding surface in at least a first supply roll conveying direction;
at least first and second driving mechanisms positioned in said roll feeding surface;
at least first and second conveying elements in each of said driving mechanisms, each said conveying element including an upper surface directly engageable with a surface of a supply roll from beneath the supply roll, and transmitting a frictional force directly to said surface of said supply roll, each said upper surface having a width, a leading end and a trailing end, said at least first and second conveying elements in each said driving mechanism being parallel to each other and extending in said at least first roll conveying direction;
means for driving said upper surface of each of said at least first and second conveying elements in each of said driving mechanisms in at least a first driving direction parallel to said at least first supply roll conveying direction, said at least first driving direction being opposite to said first supply roll conveying direction;
a lateral offset between said trailing end of said upper surface in said first driving mechanism and said leading end of said upper surface in said second driving mechanism; and
an overlap between said trailing end of said upper surface in said first driving mechanism and said leading end of said upper surface in said second driving mechanism, said overlap being arranged in said at least first supply roll conveying direction.

* * * * *